Patented May 24, 1938

2,118,129

UNITED STATES PATENT OFFICE 2,118,129

TREATMENT OF COCOA PRODUCTS

Benjamin J. Zenlea, Ozone Park, N. Y., assignor to Rockwood & Co., Brooklyn, N. Y., a corporation of Delaware No Drawing. Application April 6, 1936, Serial No. 73,049

8 Claims. (Cl. 260—34)

This invention relates to the extraction of alkaloids from cocoa products and to the conversion of theobromine to caffein. As a raw material any theobromine containing cocoa product may be employed, such as cocoa beans, shells, and various defatted or other cocoa waste products. Aside from their alkaloid content, cocoa waste products have little commercial value although they find use to some extent as fertilizers. My invention is, therefore, particularly applicable to the treatment of cocoa wastes, although it is to be understood that it is not limited in this respect.

Cocoa fines, press-cake, and the like, contain varying amounts of theobromine which are usually in the order of about 2.5%. Cocoa shell contains slightly lesser amounts of alkaloids, although the quantity thereof is sufficient to render their recovery desirable.

One object of my invention is to treat cocoa products in a simple, rapid, and efficient manner to extract the theobromine and to obtain this substance in a fairly pure state. Caffein, which is closely related chemically to theobromine, is a much more valuable product and a further object of my invention, therefore, is to convert theobromine obtained from cocoa products to caffein. According to a preferred embodiment of my invention this conversion of theobromine is effected before it has been completely isolated.

Further objects and advantages of this invention will be more apparent from the following description thereof.

Theobromine is believed to exist in cocoa partly as a free alkaloid and partly in combination as a glucoside. For practical purposes the solubility of both of these forms in hot water may be considered as one part in 115 parts hot water. While it would be most desirable to merely extract theobromine and caffein by water alone, this procedure is not commercially feasible for the reason that the filtering of such a mixture is a practical impossibility.

It has been proposed heretofore to treat cocoa products with various materials such as hydrochloric acid, lime, magnesia, and the like, to digest the cocoa and render the alkaloid easier to extract and while some of these processes have been reasonably successful, it has still been necessary to allow the suspension to settle for a considerable length of time and filtration has been a lengthy and difficult operation. These difficulties are overcome by my invention in a simple manner and without the necessity of extended preliminary treatment of the cocoa.

In accordance with my invention a sufficient quantity of hot water, preferably at or near the boiling point, is mixed with the finely divided cocoa mass to effect a complete dispersion and wetting of the particles and to obtain a major portion of the alkaloids in solution. With ordinary wastes about 1½ to 7 parts of water to one part of cocoa, by weight, is employed and the temperature of the water may vary from about 140° to 212° F. and is preferably above about 170° F. A suspension of a suitable alkaline earth oxide or hydroxide, such as calcium oxide, in hot water is then added to the cocoa and water mixture, and the mass is preferably constantly agitated during this addition. This latter treatment coagulates and settles the cocoa matter to such a degree that the mixture may be very readily filtered in a hydraulic press. Other filtering processes such as centrifuging and the like may be employed with equal facility. In fact it has been found that over 90% of the extract or liquid can be separated in an ordinary hydraulic press from a mass of about 700 pounds weight in from 25–30 minutes.

Lime has been used before in treating cocoa wastes but has not been employed in the above manner to coagulate and settle the otherwise colloidal slimy mass of solids after the extraction has been effected. When the calcium oxide and water are added to the cocoa products in accordance with my invention, the time of extraction is very greatly reduced and filtration is rendered relatively easy.

A total quantity of water should be used which is sufficient to dissolve substantially all of the theobromine in the cocoa and preferably amounts to 2–4 parts water per 1 part cocoa. There is substantially no upper limit on the quantity of water which may be employed, but if the quantity is too large the resultant extract will be so low in theobromine that recovery thereof will be difficult. If too much water is employed or if the material treated is very poor in theobromine, the extract may be used on the next batch of material and the theobromine need not be precipitated until it is present in the extract in the desired amount. The amount of water which is first added to the cocoa may be varied considerably as long as complete wetting of the particles is effected and a major portion of the alkaloids is dissolved. The amount of water employed with the alkaline earth oxide should vary inversely with the previous addition so that the total amount is proper. By suitably regulating the quantities of solids and liquid, the mixture may be easily pumped from one place to another and is thus easy to handle on a commercial scale.

Calcium oxide or hydroxide is particularly suitable as a settling or coagulating agent and may be employed in amounts varying from about 10% to 20% or more of the weight of the cocoa products on a dry basis. Magnesium oxide has some value for this purpose but much larger quantities thereof must be employed. Commercial lime contains varying amounts of magnesia and the quantity of lime used should be adjusted in accordance with its CaO and MgO contents. I have found that 15 lbs. of lime containing 80-85% CaO, per 100 lbs. of ground cocoa products is satisfactory. The alkaline earth oxide suspension is preferably at an elevated temperature when added and the addition should be made as soon as practicable after complete wetting of the cocoa particles by the hot water has been effected.

The clear filtrate obtained from this extraction process contains the alkaline earth metal salt of theobromine which is fairly soluble in water, together with impurities composed of various soluble compounds from the cocoa. This filtrate is then treated with a water soluble acidic reagent which forms an insoluble salt with the alkaline earth metal. The bicarbonate, bisulfate, bisulfite, primary and secondary phosphates of sodium, potassium and ammonium have been found suitable for this purpose. Although not as desirable, acids, such as sulfuric or phosphoric which form insoluble alkaline earth metals salts may be employed instead of a salt. An amount of such a salt or acid should be employed in excess of the theoretical molecular proportions required, in order to effect a complete precipitation of the theobromine and the insoluble alkaline earth metal salt.

The use of basic salts such as sodium carbonate precipitate only the alkaline earth carbonate, the soluble sodium salt of theobromine being formed which remains in solution. As distinguished from this reaction, I have found that the acidic reagents do not react to form soluble theobromine salts but liberate free theobromine which precipitates along with the alkaline earth metal salt. By precipitation of the alkaline earth metal salt, such as calcium carbonate, sulfate, sulfite, or phosphate simultaneously with the theobromine, the process is greatly speeded up and the alkaloid is separated from the bulk of the soluble cocoa matter very quickly. If a calcium salt is precipitated alone, as by sodium carbonate, it is still necessary to separate the theobromine from the soluble cocoa matter by a further treatment. Furthermore, when the theobromine is precipitated alone by some reagent, such as hydrochloric acid, the precipitation is very slow because of the high specific gravity of the solution containing soluble cocoa matter. By simultaneous precipitation in accordance with my invention the calcium salt aids in effecting a fast precipitation and separation of the theobromine from the soluble cocoa matter.

The precipitate of theobromine and calcium salt is then separated by filtration in any desirable manner and either purified to obtain theobromine of commercial purity, or treated directly with a suitable methylating reagent to convert the theobromine to caffein.

If the theobromine is to be separated and purified as such, this precipitate may be treated with an excess of alkaline earth oxide or hydroxide and a sufficient quantity of water to effect complete solution of the alkaline earth metal salt of theobromine which is thus formed leaving the insoluble calcium or other alkaline earth metal salts unchanged. The liquid portion is then separated by filtration and the theobromine may be re-precipitated by hydrochloric acid or other suitable agents. This treatment may be repeated as many times as desired, although with one treatment I have found that theobromine of approximately 85% purity may be obtained.

I prefer to treat the original precipitate containing the insoluble alkaline earth metal salt and theobromine directly to obtain caffein. Theobromine and caffein are both derivatives of xanthine, theobromine being 3-7 dimethylxanthine and caffein being 1-3-7 trimethylxanthine. Hence the substitution of a methyl group for the hydrogen of theobromine in the 1 position produces caffein. The alkali metal or alkaline earth metal salts of theobromine are known to react directly by double decomposition with methylating agents such as methyl chloride or methyl iodide to form caffein. I have found that under certain conditions, yields closely approximating the theoretical yield of caffein may be obtained using dimethyl sulfate as the methylating reagent for the treatment of these precipitates which contain only small amounts of theobromine.

The original precipitate which may contain about 18% theobromine is first suspended in a quantity of water equal to approximately four times the weight of the theobromine content, together with a sufficient quantity of an alkali metal hydroxide or alkaline earth oxide or hydroxide to form a water soluble salt of theobromine. This mixture is then heated slightly to a temperature in the neighborhood of 110° F., and a slight excess over the molecular quantity of dimethyl sulfate or other methylating agent is added with agitation. When using dimethyl sulfate, the methylating process is usually accompanied by a rise in temperature. The reaction starts vigorously at about 105-110° F. and may be further accelerated by heating the mass to about 180° F. and continuously agitating it. The mixture is then quickly filtered while hot to eliminate the insoluble alkaline earth metal salts. If the quantity of water employed has been properly regulated, the caffein will then crystallize as the filtrate cools. If an excess of water is used, it may be necessary to evaporate the filtrate to the crystallizing point. The caffein crystals may then be separated by filtration and the filtrate which contains a slight amount of unreacted theobromine salt may be added to the next batch for conversion. The precipitate from the methylating process usually contains some caffein held by absorption and this may be recovered by washing with water and evaporating the combined washings. If desired, the crystallized caffein may be further purified by re-crystallizing as many times as desired.

The following examples set forth two procedures which may be employed in practicing my invention.

*Example 1.*—100 pounds of ground cocoa product such as cocoa press-cake, cocoa shell, or other suitable cocoa product, are mixed with 300 pounds of water at or near its boiling point, and stirred for a few minutes until the cocoa mass is completely wetted. 15 pounds of calcium oxide suspended in 50 pounds of hot water is then added, and the whole mass is stirred to effect complete coagulation of the cocoa material.

If the cocoa material is not completely coagulated, more calcium oxide should be added. The liquid mixture is then pumped to a hydraulic press, and the soluble extract pressed out from the residue cocoa cake. By applying the pressure properly, all but a small percentage of the extract can be quickly recovered.

The extract containing calcium theobromine in solution, together with some soluble cocoa matter, is treated with an excess of sodium bisulfite; usually 2 pounds of sodium bisulfite for each 100 pounds of extract is sufficient. Calcium sulfite and free theobromine immediately begin to precipitate and the solution is allowed to stand until complete precipitation has been obtained. The precipitated solids are separated from the supernatant liquid by centrifuging.

The crude theobromine and calcium sulfite precipitate containing other impurities are treated with approximately 1½ times the quantity of lime necessary to form the calcium salt of the contained theobromine, and a quantity of hot water equal to approximately 14 times the weight of calcium theobromine formed in the mixture. If, for example, 1.8 pounds of theobromine is contained in the mixture, then the amount of calcium oxide and hot water required will be respectively 0.4 pound and 31.0 pounds.

The mass is again centrifuged, and the precipitate washed once or twice and rejected. The filtrate is acidified with hydrochloric acid to a slight acidity and the precipitated theobromine is recovered by centrifuging. Further purification may be effected if desired by repeating these steps.

If it is desirable to recover all the theobromine possible, the precipitates are subjected to washing and the combined washings evaporated, and the theobromine recovered therefrom, or, the washings can be used for adding to the new batch of cocoa product to be extracted.

*Example 2.*—A precipitate of calcium sulfite and theobromine is obtained as described in Example 1. At this point the theobromine amounting to approximately 18 per cent of the mixture is converted into caffein with a suitable methylating agent. To a mass containing 100 pounds of this crude theobromine, 110–130 pounds of water at approximately 110° F. is added together with sufficient sodium hydroxide, approximately 4.0 pounds; the sodium hydroxide may be either mixed with one part of water or in solid form. About 13 pounds of dimethyl sulphate is then added slowly with constant stirring. Reaction takes place within a few minutes and the temperature rises. If the temperature does not rise to 170° F.–180° F., it is desirable to warm the mixture to this temperature and maintain said temperature for approximately 20 minutes, although this is not absolutely necessary.

The mass is filtered hot, and the filtrate allowed to cool yielding crystalline caffein. The caffein is purified by redissolving and recrystallizing from water several times in the usual manner. The conversion of the crude theobromine into caffein can be accomplished at any stage of its purification or isolation, although I prefer to treat the first precipitate thus eliminating several purification steps from the process.

The term "cocoa" as employed in the foregoing specification and in the claims is used to denote cocoa products of all kinds and is not limited to either undefatted cocoa or defatted cocoa.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of extracting theobromine from cocoa containing material comprising treating said raw material with an extracting agent consisting substantially of a sufficient quantity of water heated to a temperature of 140 to 212° F. to effect complete wetting and dispersion of the cocoa particles, adding to the mass without substantial further heating a mixture of water and an alkaline earth oxide, and separating the solids from the liquid, the total quantity of water added to said material being sufficient to dissolve substantially all of the theobromine present therein.

2. A process of treating cocoa products comprising mixing about 1½–7 parts of water free from acid and heated to a temperature of 140 to 212° F. with one part of finely divided cocoa products, promptly adding to this mixture with agitation a suspension of at least $\frac{1}{10}$ part of an alkaline earth oxide in water, and separating the solids from the liquid.

3. A process of treating cocoa products comprising mixing about 2–4 parts of water free from acid and heated to a temperature of 170 to 212° F. with one part of finely divided cocoa products, adding to this mixture promptly after complete wetting is obtained a suspension of at least $\frac{1}{10}$ part of calcium oxide in water, and filtering the mass under pressure.

4. A process of treating cocoa products comprising mixing about 1½–7 parts of water heated to a temperature above about 140° F. with one part of finely divided cocoa products, promptly adding to this mixture with agitation a suspension of at least $\frac{1}{10}$ part of an alkaline earth oxide in water, separating the solids from the liquid, and treating the liquid extract with a readily soluble acid salt from the group consisting of water soluble bicarbonates and bisulfites to precipitate simultaneously the theobromine and the corresponding alkaline earth metal salt.

5. A process of treating cocoa products comprising mixing about 1½–7 parts of water heated to a temperature above about 140° F. with one part of finely divided cocoa products, adding to this mixture with agitation a suspension of at least $\frac{1}{10}$ part of an alkaline earth oxide in water, separating the solids from the liquid, treating the liquid extract with a water soluble bicarbonate, re-dissolving the theobromine in the precipitate as a soluble salt, and treating the mixture containing the theobromine salt in solution and the undissolved precipitate with dimethyl sulfate to convert the theobromine to caffein.

6. In a process of extracting theobromine from cocoa products in which a solution of an alkaline earth metal salt of theobromine is obtained, the steps of treating said solution with a water soluble bicarbonate to precipitate simultaneously the theobromine and alkaline earth metal carbonate, redissolving the theobromine contained in the precipitate by treatment with a material from the group consisting of oxides and hydroxides of alkali and alkaline earth metals, and treating this mixture at an elevated temperature with dimethyl sulfate as a methylating agent.

7. In a process of extracting theobromine from cocoa products in which a solution of an alkaline earth metal salt of theobromine is obtained, the steps of treating said solution with a soluble bicarbonate to precipitate both the theobromine and an insoluble salt of the alkaline earth metal, redissolving the theobromine contained in the precipitate by treatment with a material from the group consisting of oxides and hydroxides of alkali and alkaline earth metals and just sufficient water to dissolve the theobromine salt formed, heating this mixture to a temperature of at least about 105° F., adding dimethyl sulfate, and filtering the reacted mixture at an elevated temperature.

8. A process of treating cocoa products comprising mixing about 1½–7 parts of water heated to a temperature above about 140° F. with one part of finely divided cocoa products, adding to this mixture promptly after complete wetting is obtained a suspension of at least $\frac{1}{10}$ part of an alkaline earth oxide in water, separating the solids from the liquid, treating the liquid extract with a soluble acid salt from the group consisting of alkali metal bicarbonates and bisulfites, filtering, treating the precipitate with an aqueous suspension of an alkaline earth metal oxide, filtering this mixture, and recovering the theobromine from the filtrate.

BENJAMIN J. ZENLEA.